May 20, 1952  R. SENSAUD DE LAVAUD  2,597,388
ELECTROMAGNETIC CLUTCH
Filed Aug. 25, 1947  3 Sheets-Sheet 1
FIG. 3.
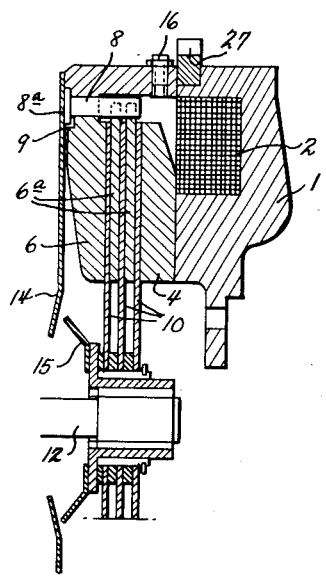
FIG. 1.
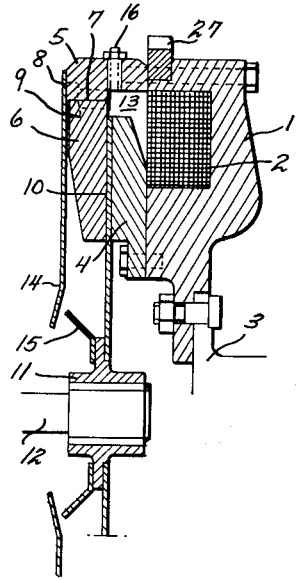
FIG. 2.
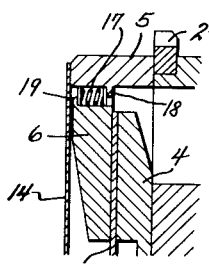
FIG. 4.
FIG. 5.
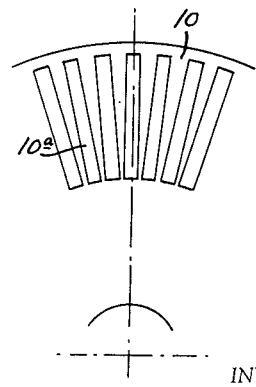
INVENTOR
ROBERT SENSAUD DE LAVAUD
BY Wilkinson & Mawhinney
ATTORNEYS May 20, 1952  R. SENSAUD DE LAVAUD  2,597,388
ELECTROMAGNETIC CLUTCH

INVENTOR
ROBERT SENSAUD DE LAVAUD

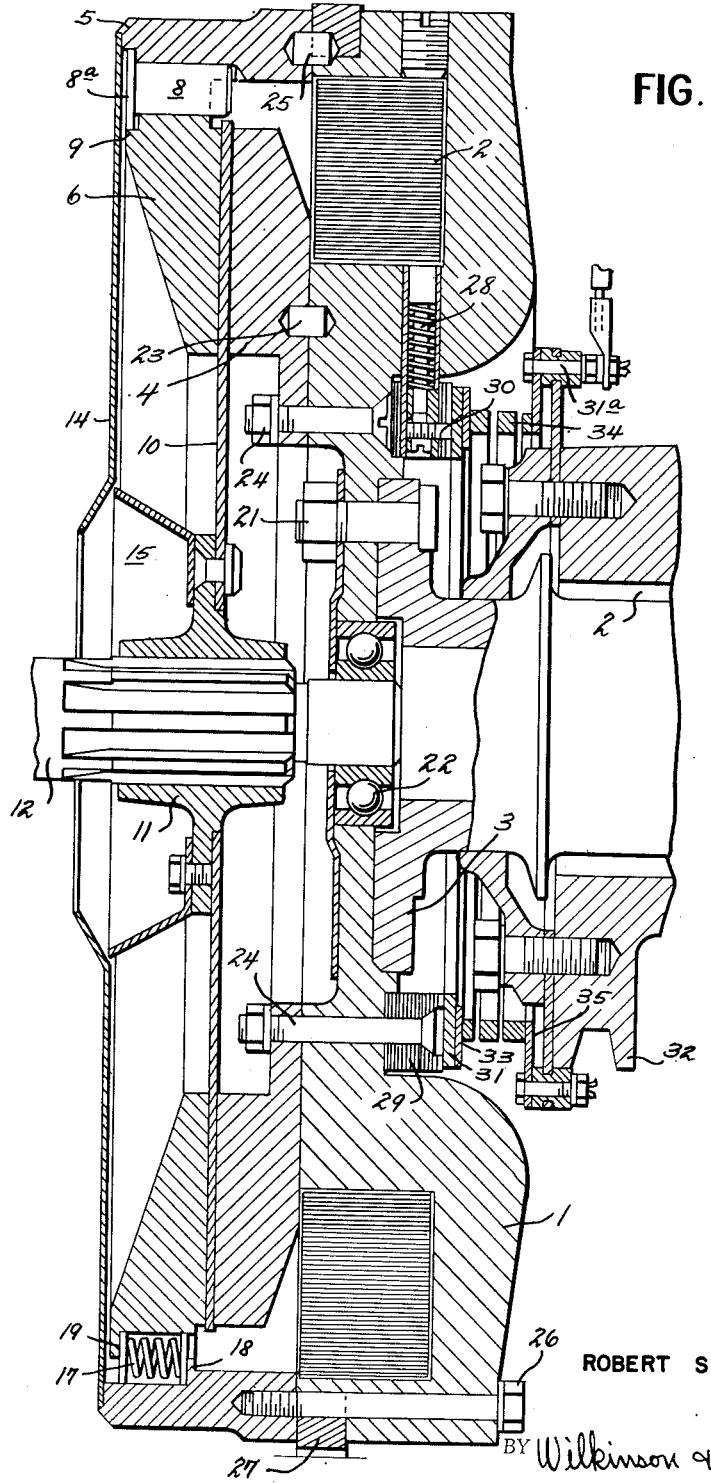

Patented May 20, 1952

2,597,388

UNITED STATES PATENT OFFICE 2,597,388

ELECTROMAGNETIC CLUTCH

Robert Sensaud de Lavaud, Sao Paulo, Brazil

Application August 25, 1947, Serial No. 770,451
In France September 14, 1946

4 Claims. (Cl. 192—84)

The present invention relates to improvements in electro-magnetic clutches of the kind in which the axial force which determines the pressure of contact between the friction surfaces respectively integral with the driving and driven shafts, results from the pull exerted by an electro-magnet on a movable armature through which the magnetic circuit is closed.

In known clutches of this kind, the movable armature is directly integral with the driven shaft thereby appreciably increasing its inertia by behaving as a heavy fly-wheel. This fact constitutes a serious disadvantage when the clutch is applied to traction motors, because it makes it necessary to resort to devices for braking the driven shaft in order to allow gear changing.

The purpose of the invention is especially to overcome the said disadvantage and the improvements which form the object thereof are mainly characterised by the fact that the armature is angularly integral with the driving shaft but axially movable with respect to said shaft, in order to be able to apply to surfaces integral with the driven shaft, the gripping effort produced by the friction coupling.

This fundamental definition of the invention shows at once that the friction surfaces integral with the driven shaft may be provided on a disc of greatly reduced inertia since it must be designed solely to resist the torques to be transmitted and that its mass no longer comes into play from a magnetic point of view.

It is possible to design the said disc so as to ensure coupling by bringing into play, in addition to the friction due to magnetic gripping, induced currents which react on the magnetic field during the period of slipping.

The invention, such as it has just been defined fundamentally, allows of various constructional forms and, in particular, of those applying, separately or in any combination, the following main features:

a. The disc integral with the driven shaft is cut out from magnetic sheet steel and secured to a hub keyed to said shaft, the said disc being placed between friction surfaces arranged on the one hand on a magnetic wheel keyed to the driving shaft and, on the other hand, to an armature for closing the magnetic circuit mounted so as to rotate with the wheel and to move axially.

b. The movable armature is divided into rings, free in the axial direction, between which are interposed discs integral with the driven shaft.

c. The magnetic wheel and the movable armature are arranged so as to form an annular housing whose internal space forms an oil tank.

d. The one or several discs integral with the driven shaft are of non-magnetic metal and, in their peripheral portion engaging the magnetic field, they are provided with bars of magnetic metal and the adjoining faces of the magnetic masses which rotate with the driving shaft are coated with a layer of non magnetic metal in which the relative rotation of the driving and driven masses, during slipping, creates induced currents which produce, through reaction on the magnetic field, a connecting couple which adds its effects to the friction torque.

e. The disc or discs integral with the driven shaft are of magnetic metal and are cut out on their periphery so as to produce, during slipping, variations in the magnetic flux which create induced currents under the conditions of the foregoing paragraph d.

f. The friction surfaces are coated with a thin layer of metal having a specified coefficient of friction.

g. The excitation of the coil of the magnetic fly-wheel is controlled in function of the value of the driving couple.

h. The exciting current of the coil of the magnetic fly-wheel is controlled by a rheostat driven from the vacuum at the intake of the motor or from the pressure of the exhaust gases, or, again, from a simultaneous action of the said two variables.

The invention also relates to other advantageous characteristics which will be made clear in the following description, when read in conjunction with the accompanying drawings illustrating by way of example only, forms of clutches embodying the characteristics previously defined.

Fig. 1 is a diagrammatic partial axial section of one form of embodiment.

Fig. 2 is a partial axial section corresponding to Fig. 1, but on a different radial plane.

Fig. 3 is a view similar to Fig. 1 showing a second form of embodiment.

Fig. 4 is a partial axial section showing a third form of embodiment.

Fig. 5 is a partial end view of the disc keyed to the driven shaft, in the form of embodiment of Fig. 4.

Fig. 10 is an axial section as a whole of a clutch disposed according to the diagram of Fig. 1.

Figure 6:
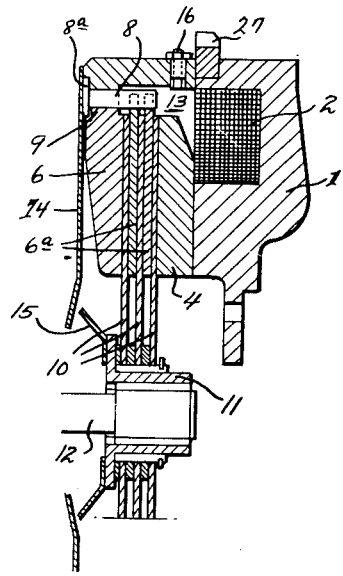
Figs. 6 and 7 are views corresponding respectively to Figs. 4 and 5 showing yet another form of construction.

As shown in particular in Fig. 1, the magnetic fly-wheel 1, keyed to the driving shaft 3, contains, in an annular recess, the winding 2 or induction coil whose excitation produces a magnetic field of toric shape which is completed across a ring 4 secured to the wheel 1, a movable armature 6 and a second ring 5 also secured to the wheel. The armature 6 is guided in a bore 7 of the ring 5 with which it is in rotational connection but which may undergo axial displacements. The angular connection between the ring 5 and the armature 6 is for example ensured by fingers 8 whose head 8a is, as shown in Fig. 3, secured to the ring 5 by a side plate 14 secured to the latter. The heads 8a serve as stops for the movable armature 6 when the latter is brought into declutching position by springs 17 (Fig. 2) distributed over the circumference of the armature 6. Declutching occurs when the coil 2 is no longer excited. The springs 17 bring about the axial displacement of the ring 6 in the bore 7 by bearing against the collars 18 and 19. The said axial displacement corresponds to the play shown at 9.

A disc 10, of magnetic sheet steel, is integral with a hub 11 secured to the driven shaft 12. The said disc fits, on its circumference, between the ring 4 and the ring 6 and, upon excitation of the coil 2, the magnetic flux brings about the attraction of the movable ring 6 by clamping the disc 10 between the opposite faces of the ring 4 and the ring 6. The annular hollow 13 is continually filled with oil and the side plates 14 and 15 form an impervious rotating housing for retaining the oil which lubricates the friction surfaces of the clutch. Fresh oil may be introduced by removing a plug 16. Upon each friction surface of the rings 6 and 4 spiral slots may be provided arranged in such a way that they bring back the oil towards the centre during the periods of slipping of the disc 10 between the ring 6 and the ring 4. The friction surfaces are preferably coated, either by electrolysis or by any suitable metallization process, with suitable metals having a specified coefficient of friction.

Figure 3 shows a clutch with three discs 10 between which are placed rings 6a angularly connected to the ring 6 by fingers 8 and movable in the axial direction. In this form of construction, the frictional torque is three times as large as in the case of Figure 1 with a single disc, for the same sizes of the fly-wheel and its coil and for the same exciting current.

During the period of slipping, the relative motion between the disc 10 and the fly-wheel 1 may be used to produce a variation of flux in the air gap between the ring 4 and the ring 6. For such purpose, a certain thickness of metal which is a good conductor and non magnetic, is laid on each of the surfaces of the ring 4 and ring 6, on the side of the air gap, the said metal adhering perfectly to the magnetic steel surfaces of the said parts. During the period of slipping, the relative angular displacement of the disc 10 and of the parts 4 and 6 creates, in the thickness of the good conducting metal deposited on the said parts, induced currents whose reaction on the magnetic field produces a driving torque of the disc 10 through the wheel 1. On the other hand, the flux passing in the air gap between the parts 4 and 6 attracts the ring 6 by clamping the disc as in the construction of Figure 1 and a frictional torque is added to the torque by reaction of the induced currents. This arrangement gives the maximum of torque by the induced currents, upon starting, that is during the period of considerable slipping. The demagnetizing ampere-turns, for a high frequency, diminish the attraction flux in the air gap and thus reduce friction. Wear is therefore at a minimum during the period of considerable slipping. On the contrary, for minor slipping, the induced currents being weaker, the demagnetizing ampere-turns diminish, the attraction flux increases in the air gap and friction also increases. At a certain moment, and progressively, a positive drive without slipping is attained, when the frictional torque is of the same value as the motor torque.

As already stated with regard to Figures 1 and 3, the friction surfaces are preferably coated with suitable metals having a specified coefficient of friction.

Figures 4 and 5 show a form of embodiment of a clutch adapted to operate under the conditions already described. In this form of embodiment, the same parts are to be found as in Figure 1 and are designated by the same reference numerals. However, the disc 10 is of non magnetic material and carries, opposite the parts 4 and 6, a certain number of bars 10a, of magnetic steel, embedded in the thickness of the disc. A deposit of conducting metal 20, copper for example, on the friction surfaces of the parts 4 and 6 of magnetic steel, allows of the formation of induced currents. The said currents are produced during slipping, that is during the relative rotation of the wheel 1 relative to the disc 10, the latter acting as flux changer with the above described effects.

To obtain a suitable friction, without wear, the conducting surfaces 20 of the parts 4 and 6 are coated with a very thin layer of hard metal, chromium for example. Spiral slots may be provided on the said surfaces to bring back the oil towards the centre during the periods of slipping.

Figure 7:
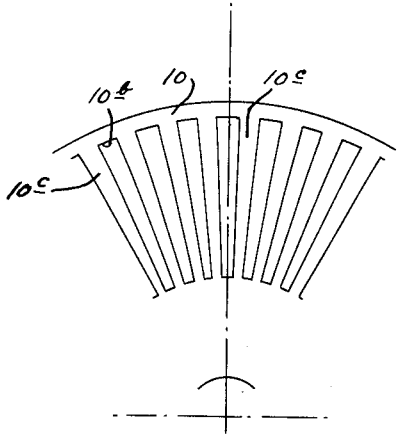

Figures 6 and 7 show an induced current device comprising three discs 10. As a variant of the case of Figures 4 and 5, the said discs are of magnetic sheet steel and have portions of their faces radially cut away at circumferentially spaced apart places to provide recessed spaces 10b and intervening solid parts 10c which correspond to the magnetic bars 10a of Figure 5 of the drawings. In addition to the end elements 4 and 6 integral with the wheel 1, intermediary rings 6a, also rotationally integral with the wheel 1, but axially free, are placed between the discs 10 and are coated on their friction surfaces with a conducting metal suitable for the formation of induced currents. Such a device enables a more powerful clutch to be produced, in a same diametrical space and with the same fly-wheel and the same coil, for a same consumption of exciting current, as in the case of Fig. 4.

In all the constructional forms described, due to the operation in oil, the wear of the friction surfaces is practically negligible and the taking up of play is automatic.

Figure 10 shows a clutch whose general arrangement is the one shown diagrammatically in Figure 1. The same numerals designate the same members or the members which correspond on all the figures of the drawings. The driving shaft 2, which is the crank-shaft of an automobile engine, comprises a flange 3 on which is centered and secured, by bolts 21, the hub of the magnetic fly-wheel 1. The driven shaft 12 is centered with respect to the shaft 2 by means of a ball bearing 22. The ring 4, centered by studs 23, is secured to the wheel 1 by bolts 24. The ring 5 is centered by studs 25 and is secured by screws 26. The toothed rim connected to the starter is shown at 27. The current is led to the coil 2 by a terminal 28 through a ring 29 of insulating material secured to the wheel 1 by means of some of the bolts 24. The terminal is connected at 30 to a conducting ring 31 secured to the insulating ring 29 and the current is led, from the insulating terminal 31a carried by the motor housing 32, to the ring 31, by means of the annular sliding contact 33, the spring 34 and the insulated fixed support 35. The exciting circuit of the coil 2 is closed by the mass of the parts.

In order to obtain a maximum of flexibility in the operation of the clutch, there is added, according to a characteristic of the invention, an excitation changer of the coil which allows of limiting the value of the clutch torque to the actual value of the motor torque. In such a case, any instantaneous variation in the torque is absorbed by an instantaneous slipping. Great flexibility is thus obtained in transmission and any abnormal stresses on the mechanical parts are suppressed. In addition, the adjustment of the exciting current according to the motor torque gives rise to a great economy in the consumption of electric energy. For said adjustment, it is possible to make use of a variable resistance or rheostat actuated either by the vacuum at the inlet of the suction-pipe of the motor, or by the pressure of the exhaust gases, or by both of the said variables at the same time.

It is to be noted that the inductance of the induction coil 2 allows of absorbing any instantaneous change in the motor torque, because it opposes the instantaneous increase of the current supplied by the changer, by producing temporary slipping of the clutch.

Figure 8:
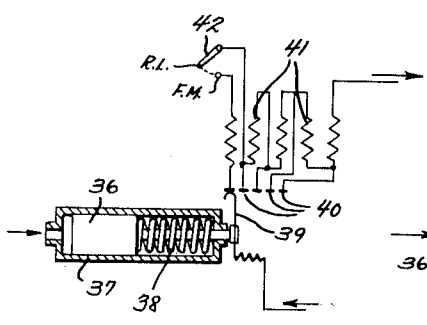
Figs. 8 and 9 are diagrams of devices for controlling the excitation of the winding of the magnetic wheel.

Figure 8 shows a device for varying the exciting current of the coil. In this example, as a controlling variable, use is made of the gas pressure at the exhaust which acts in a cylinder 37 on a piston 36 loaded by a spring 38, in order to move a sliding contact 39 on the studs 40 of several series resistances 41. At low speed, that is to say at the minimum pressure of the gases at the exhaust, the exciting current is at its minimum intensity. As the power of the motor increases, the exhaust pressure increases and the sliding contact 39 moves and reduces the resistance of the circuit while increasing the flow of the exciting current. The said device therefore permits of proportioning the exciting current in function of the power of the motor. Any sharp increase of the motor torque is absorbed by the slipping of the clutch under the effect of the inductance of the exciting coil.

Figure 9:
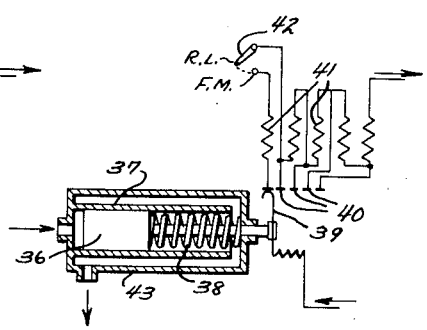

Figure 9 shows a similar device to that of Figure 8, but in this case, the vacuum at the intake of the motor is also made to intervene, by joining the intake pipe to an impervious enclosed space 43 surrounding the cylinder 37 of Figure 8. The action of the vacuum is made manifest on the other face of the piston 38 controlling the sliding contact 39 by adding its force to that of the pressure of the exhaust gases.

A device for breaking contact may be provided, in the event of the invention being applied to an automobile, to allow of free wheeling when, for example, the accelerator pedal being free, the engine is running idle, or to cut off the excitation of the coil when the automobile has stopped with its engine running idle. For the said purpose, the first of the resistance 41 may be connected by a switch 42 to the next resistance, in such a way that, for a position R L of the said switch, the current is cut off and the car is unclutched, that is free wheeling. In the position F M of the switch, the engine acts as a brake, when the accelerator pedal is released.

The discs 10 on the driven shaft 12 may be very light, thus ensuring great ease of operation when changing speeds, when the clutch is applied to an automobile transmission, or for any other transmission which necessitates a wide scale of reduction.

Changing from one speed to another is preceded by an automatic cut-off of the exciting current which persists during the short moment of the operation. The clutch pedal is done away with so that the comfort and the driving of the car are considerably improved.

The improved clutches as described constitute new industrial products covered as such by the invention.

I claim:

1. An electro-magnetic clutch between a drive and a driven shaft, which clutch comprises a magnetic fly-wheel secured on the drive shaft, an annular induction coil mounted on said fly-wheel to create a magnetic field, a magnetic circuit including a magnetic plate secured to said fly-wheel, a back-plate of magnetic metal secured to said magnetic fly-wheel but axially movable relatively thereto, and an annular ring secured to said magnetic fly-wheel on the periphery thereof and having said back-plate mounted within it for axial sliding movement relatively to said ring and for rotational drive connection therewith, and at least one disc secured to said driven shaft and interposed between the cooperating facing surfaces of said magnetic plate and said back-plate, said disc being made of a non-magnetic metal and provided at its periphery opposite said facing surfaces with bars of a magnetic metal equal in thickness to said disc and radially disposed, the adjacent faces of said magnetic plate and said back-plate being lined with a layer of non-magnetic metal.

2. An electro-magnetic clutch as in claim 1 wherein said radially disposed bars of magnetic metal are embedded in said disc.

3. An electro-magnetic clutch as in claim 1, characterized by the fact that said bars are substantially equal in length to the width of said magnetic plate and of said back-plate, and that the surfaces of the magnetic plate and the back-plate are provided with a coating of a conductive metal having a high wear-resistance characteristic.

4. An electro-magnetic clutch as in claim 3 wherein said coating comprises copper.

ROBERT SENSAUD de LAVAUD.

REFERENCES CITED

The following references are of record in the file of this patent:

UNITED STATES PATENTS

| Number | Name | Date |
| --- | --- | --- |
| 653,424 | Lunt | July 10, 1900 |
| 912,504 | Stecket et al. | Feb. 16, 1909 |
| 1,139,005 | Whitcomb | May 11, 1915 |
| 1,746,494 | Norton | Feb. 11, 1930 |
| 1,823,334 | Payne | Sept. 15, 1931 |
| 1,968,583 | Apple | July 31, 1934 |
| 2,029,862 | Dodge | Feb. 4, 1936 |
| 2,075,879 | Hansen | Mar. 30, 1937 |
| 2,254,625 | Ryba | Sept. 2, 1941 |
| 2,368,304 | Kattwinkel | Jan. 30, 1945 |

OTHER REFERENCES

Ser. No. 402,024, Kattwinkel (A. P. C.), published May 18, 1943.